United States Patent
Burns

(10) Patent No.: US 9,675,163 B2
(45) Date of Patent: Jun. 13, 2017

(54) FLEXIBLE AND SECURELY ADJUSTABLE CARRIER FOR BULKY ITEMS

(71) Applicant: Ona Burns, New York, NY (US)

(72) Inventor: Ona Burns, New York, NY (US)

(*) Notice: Subject to any disclaimer, the term of this patent is extended or adjusted under 35 U.S.C. 154(b) by 0 days.

(21) Appl. No.: 15/280,756

(22) Filed: Sep. 29, 2016

(65) Prior Publication Data

US 2017/0086567 A1 Mar. 30, 2017

Related U.S. Application Data

(60) Provisional application No. 62/234,366, filed on Sep. 29, 2015.

(51) Int. Cl.
*A45F 5/00* (2006.01)
*A45F 3/14* (2006.01)
*A47J 47/14* (2006.01)

(52) U.S. Cl.
CPC ............... *A45F 3/14* (2013.01); *A47J 47/14* (2013.01)

(58) Field of Classification Search
CPC ...... A61G 1/01; A61G 1/013; A61G 2200/34; A61G 2200/32; A45F 3/22; A45F 5/00; A45F 5/10; A45F 3/14; A61F 5/3776; A47G 9/04; A47D 13/02; A45C 13/26; B65G 7/12; A47J 47/14
See application file for complete search history.

(56) References Cited

U.S. PATENT DOCUMENTS

| | | | | |
|---|---|---|---|---|
| 618,333 | A * | 1/1899 | Colteryahn | A45F 5/10 24/17 A |
| 5,911,463 | A * | 6/1999 | Fesko | B65F 1/00 294/152 |
| 6,758,596 | B2 * | 7/2004 | McDonough | B65F 1/0006 294/156 |
| 7,946,639 | B2 * | 5/2011 | Bridges | B66C 1/12 294/152 |
| 8,065,765 | B2 * | 11/2011 | Rincon | A61G 1/01 5/625 |

* cited by examiner

*Primary Examiner* — Stephen Vu
(74) *Attorney, Agent, or Firm* — Abelman, Frayne & Schwab

(57) ABSTRACT

A flexible carrier for manually transporting bulky items, such as covered casseroles and pots containing hot food, large packages, and the like is formed by joining together an elongated flexible handle panel of predetermined length in overlying relation to an elongated securing panel of predetermined length in a transverse centrally positioned orientation, the distal or free ends of each of the respective panels being provided with a plurality of hook and loop fasteners dimensioned and configured to engage in mating overlying relation to secure the bulky item centrally in the securing panel at the intersection of the joined panels, and to join the opposing ends of the handle panel above the secured item for manual transport.

20 Claims, 5 Drawing Sheets

Embodiment 2 -Top view - open

Embodiment 2 -Top view - open

US 9,675,163 B2

FLEXIBLE AND SECURELY ADJUSTABLE CARRIER FOR BULKY ITEMS

BACKGROUND OF THE INVENTION

Field of the Invention

The present invention relates to adjustable carriers for manually transporting bulky items.

Description of Related Art

Transporting bulky items can be a difficult endeavor. Retail vendors and stores may tie up a large box or article with string or plastic wrap and attach a handle to facilitate transporting manually. The string or plastic wrap is typically not reused and is thrown away when the bulky item arrives at its destination. With people becoming more and more conscience of their carbon footprint in the world, a need for reusable products is increasing.

People frequently need to transport trays, casserole dishes, pots or other types of food containers to a relative or friend's house for potlucks, dinners, cocktail parties, among other reasons. A large cooking utensil containing food won't fit into a shopping bag because frequently the circumference is too large, and turning it on its side would cause spillage. The cooking utensil also won't fit into commercially available rigid casserole carriers because it usually is too tall. Therefore, a flexible, adjustable, reusable, and inexpensive bulky item carrier is needed.

An object of the present invention is therefore to provide a flexible, adjustable, reusable, and secure carrier for one or more bulky items.

SUMMARY OF THE INVENTION

A flexible carrier for manually transporting bulky items, such as covered casseroles and pots containing hot food, large packages, and the like is formed by joining together an elongated flexible handle panel of predetermined length in overlying relation to an elongated securing panel of predetermined length in a transverse centrally positioned orientation, the distal or free ends of each of the respective panels being provided with a plurality of hook and loop fasteners dimensioned and configured to engage in mating overlying relation to secure the bulky item centrally in the securing panel at the intersection of the joined panels, and to join the opposing ends of the handle panel above the secured item for manual transport.

The article of the invention is an improved versatile and inexpensive carrier for bulky items that is flexible and adjustable and comprises:

a. a handle panel (101) comprising
   an interior side,
   an exterior side,
   a central section, and
   opposing ends;
b. a securing panel (103) securely connected to the handle panel (101) via a fastening device (117), the securing panel comprising
   an interior side,
   an exterior side,
   a central section, and
   opposing ends;
c. handles (105a and 105b) secured by fastening means (107a and 107b, respectively) to each of the opposing ends of handle panel (101) for lifting the carrier when the handles are brought together above the central sections of the handle panel (101) and securing panel (103);
d. a strip of hook-and-loop tape (109) secured to the interior side and extending along the longitudinal axis of the securing panel (103);
e. a strip of hook-and-loop tape (113) secured to interior side and extending transversely to the longitudinal axis proximate the end of securing panel (103);
f. a strip of hook-and-loop tape (111) secured to the exterior side and extending along the longitudinal axis of the securing panel (103);
g. a strip of hook-and-loop tape (115) secured to the exterior side and extending transversely to the longitudinal axis proximate the end of securing panel (103).

As used herein, the term "handle panel" refers to the panel of the carrier to which the handles are attached. The term "securing panel" refers to the panel of the carrier to which the hook-and-loop fasteners are attached.

The material from which the carrier is constructed can be selected based upon its intended use. As will be apparent to one of ordinary skill in the art, the materials of construction can be fabric, plain and coated paper, including specifically plastic coated or laminated paper, plastic in the form of a film or web, woven and non-woven plastic materials, jute and the like, and canvas, among others. These materials can be obtained inexpensively. The type of fasteners used depends on the material from which the carrier is made and can include thread for stitching, rivets and adhesive bonding. It will be obvious to one of ordinary skill in the art that the edges may be folded over on themselves and stitched to form a seam. Piping may also be added to provide further support. In its paper, plastic and jute versions, the carrier is reusable. In its fabric version, the carrier is both reusable and washable. In all versions, logos or brand names may be printed on the side panels for advertising.

The carrier is able to accommodate a wide variety of items, including shipping boxes, lidded pots and pans, and plastic containers filled with hot and cold food. The hook-and-loop tape fastener allows the user to securely adjust the size of the carrier to accommodate a variety of containers of varying sizes.

The carrier is simple to use, thereby allowing a broad range of uses. The item to be carried is placed in the center of the open carrier, the securing panels are folded across the item to be carried and secured by pressing the opposing faces of the hook-and-loop fasteners into engagement, and raising the handle panels to join the handles together for transportation.

BRIEF DESCRIPTION OF DRAWINGS

The foregoing summary, as well as the following detailed description will be best understood when read in conjunction with the attached drawings in which the same or similar elements are referred to by the same numeral, and where.

DETAILED SUMMARY OF THE INVENTION

The present system facilitates carrying bulky items with a flexible, adjustable, reusable, and inexpensive secure carrier.

Figure 1:
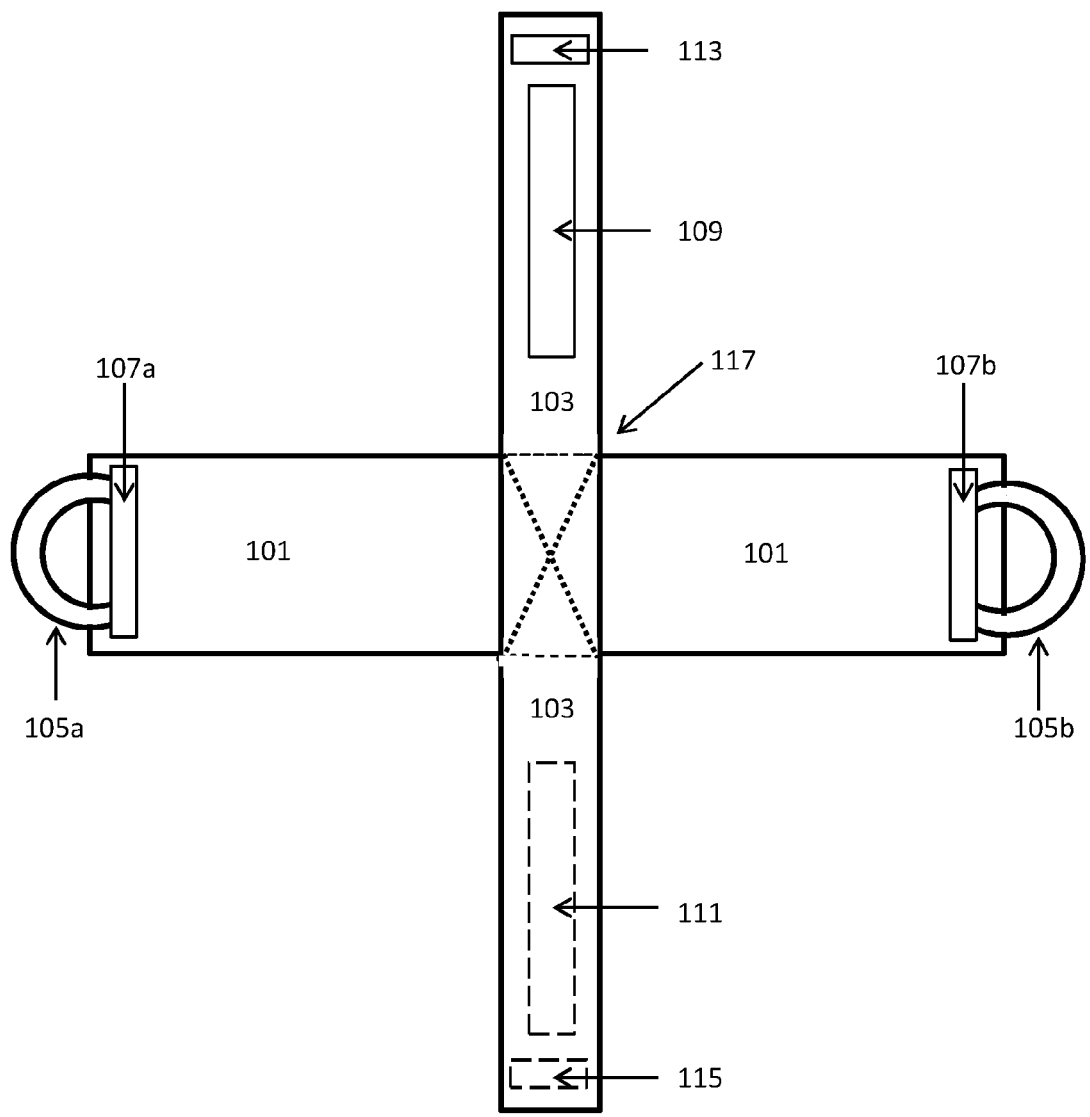
FIG. 1 is a schematic diagram of a top view of a first embodiment of the carrier in an open position.
Figure 2:
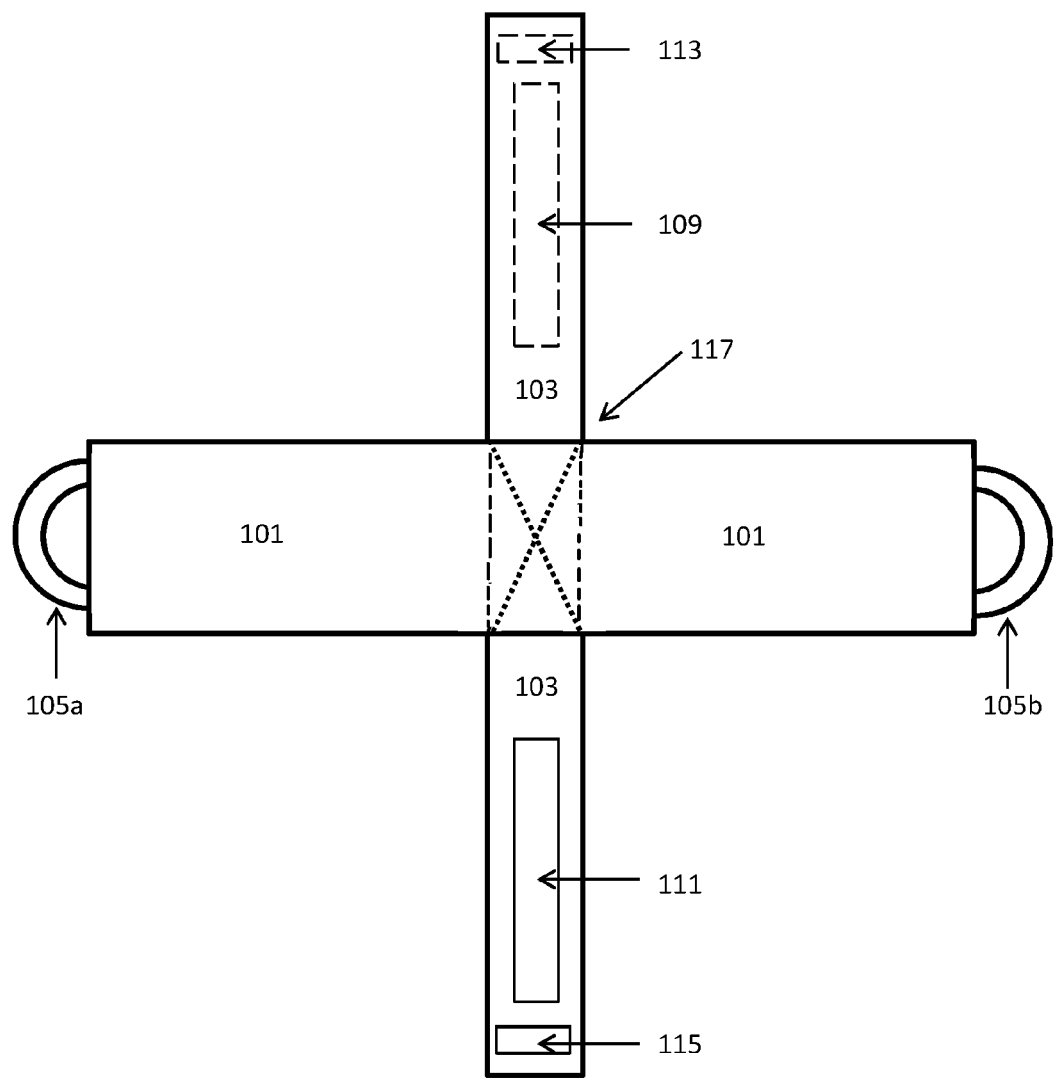
FIG. 2 is a schematic diagram of a bottom view of a first embodiment of the carrier in an open position.

Referring to FIG. 1, the inside of the adjustable carrier in the open position is schematically illustrated. Handle panel 101 is transverse securing panel 103 and is connected via a fastening device 117. In this view the interior sides of the handle panel 101 and securing panel 103 are shown. Handles 105a and 105b are fastened to the interior of the handle panel 101 via a handle fastener 107a and 107b, respectively, on opposing ends of handle panel 101.

On the interior of the securing panel 103, there is a strip of hook-and-loop tape 109, extending along the longitudinal axis of the securing panel 103. Also on the interior of the securing panel 103, there is a strip of hook-and-loop tape 113, extending traversely to the longitudinal axis of proximate the end of the securing panel 103.

On the exterior of the securing panel 103, there is a strip of hook-and-loop tape 111, extending along the longitudinal axis of the securing panel 103. Also on the exterior of the securing panel 103, there is a strip of hook-and-loop tape 115, extending traversely to the longitudinal axis of proximate the end of the securing panel 103.

In one embodiment, handle panel 101, securing panel 103, and handles 105a and 105b are made out of fabric. In a preferred embodiment, at least the handle panel 101 is folded to a doubled-over thickness. In another embodiment, the handle panel 101 and the securing panel 103 are folded to a doubled-over thickness. The handle fasteners 107a and 107b are securely stitched to the handles 105a and 105b to join then to the opposite ends of the interior of the handle panel 101. In this embodiment, opposing hook-and-loop tape 109, 111, 113, and 115 are stitched to securing panel 103. Also in this embodiment, handle panel 101 is joined by stitching 117 to securing panel 103.

In another embodiment, handle panel 101, securing panel 103, and handles 105a and 105b are made out of paper. The handle fasteners 107a and 107b are strips of paper bonded to handle panel 101, to which handles 105a and 105b are securely bonded under to join them to handle panel 101 on opposing ends of the interior of the panel. In this embodiment, opposing hook-and-loop tape elements 109, 111, 113, and 115 are bonded to securing panel 103. Also in this embodiment, handle panel 101 is joined by adhesive bonding 117 to securing panel 103.

In another embodiment, handle panel 101, securing panel 103, and handles 105a and 105b are made out of plastic. The handle fasteners 107a and 107b are strips of plastic bonded to handle panel 101, to which handles 105a and 105b are securely bonded under to join them to handle panel 101 on opposing ends of the interior of the panel. In this embodiment opposing hook-and-loop tape elements 109, 111, 113, and 115 are bonded to securing panel 103. Also in this embodiment, handle panel 101 is joined by adhesive bonding 117 to securing panel 103.

In another embodiment, handle panel 101, securing panel 103, and handles 105a and 105b are made out of jute. In a preferred embodiment, at least the handle panel 101 is folded to a doubled-over thickness. The handle fasteners 107a and 107b are securely stitched to the handles 105a and 105b to join them to the opposite ends of the interior of the handle panel 101. In this embodiment, opposing hook-and-loop tape elements 109, 111, 113, and 115 are stitched to securing panel 103. Also in this embodiment, handle panel 101 is joined by stitching 117 to securing panel 103.

In another embodiment, regardless of carrier material, handle fasteners 107a and 107b have a hook-and-loop tape side facing away from the handle panel 101. The handle fasteners 107a and 107b can then be used for extra security by pressing the opposing faces of the hook-and-loop fasteners in to engagement.

Figure 3:
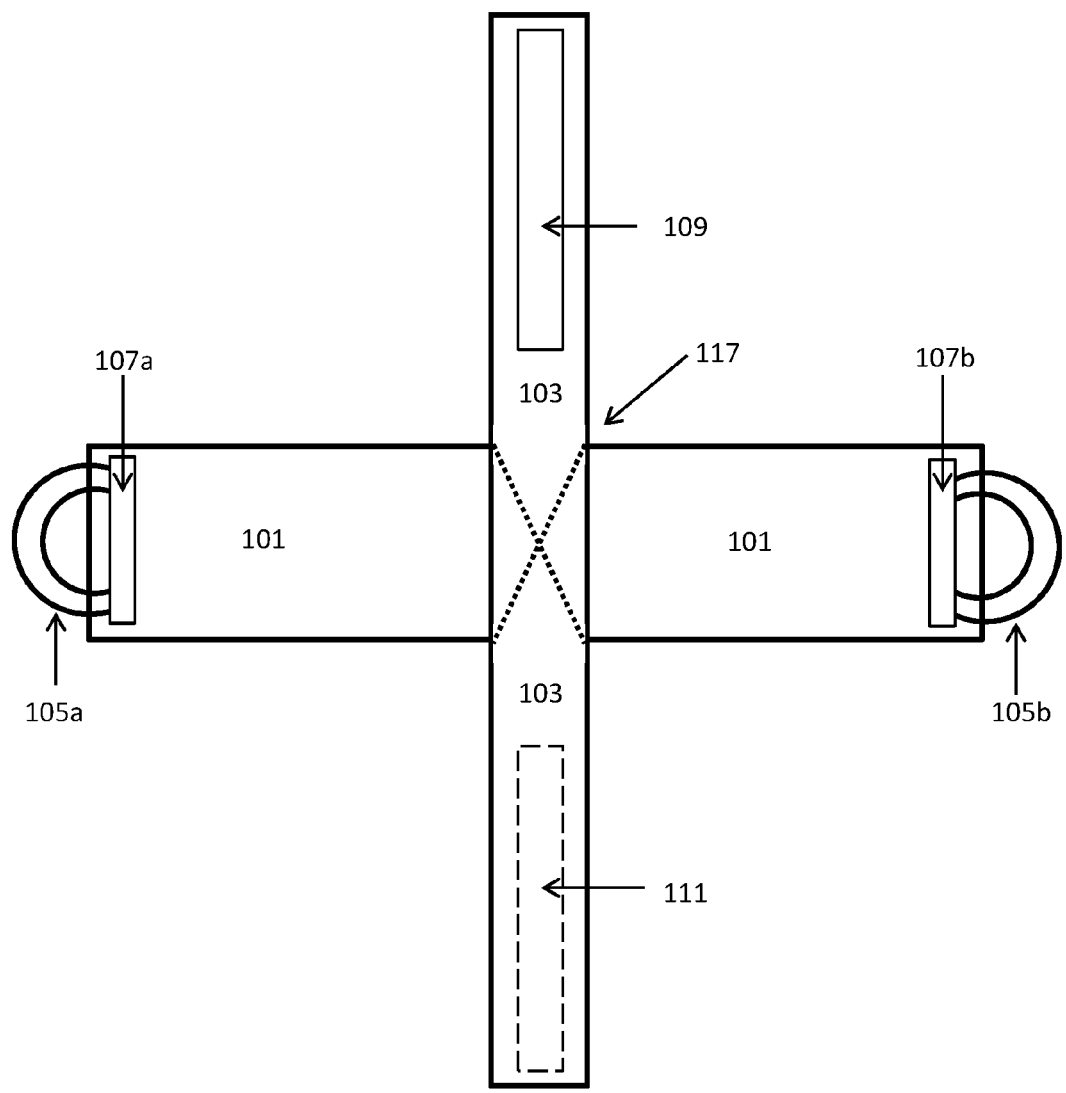
FIG. 3 is a schematic diagram of a top view of a second embodiment of the carrier in an open position.
Figure 4:
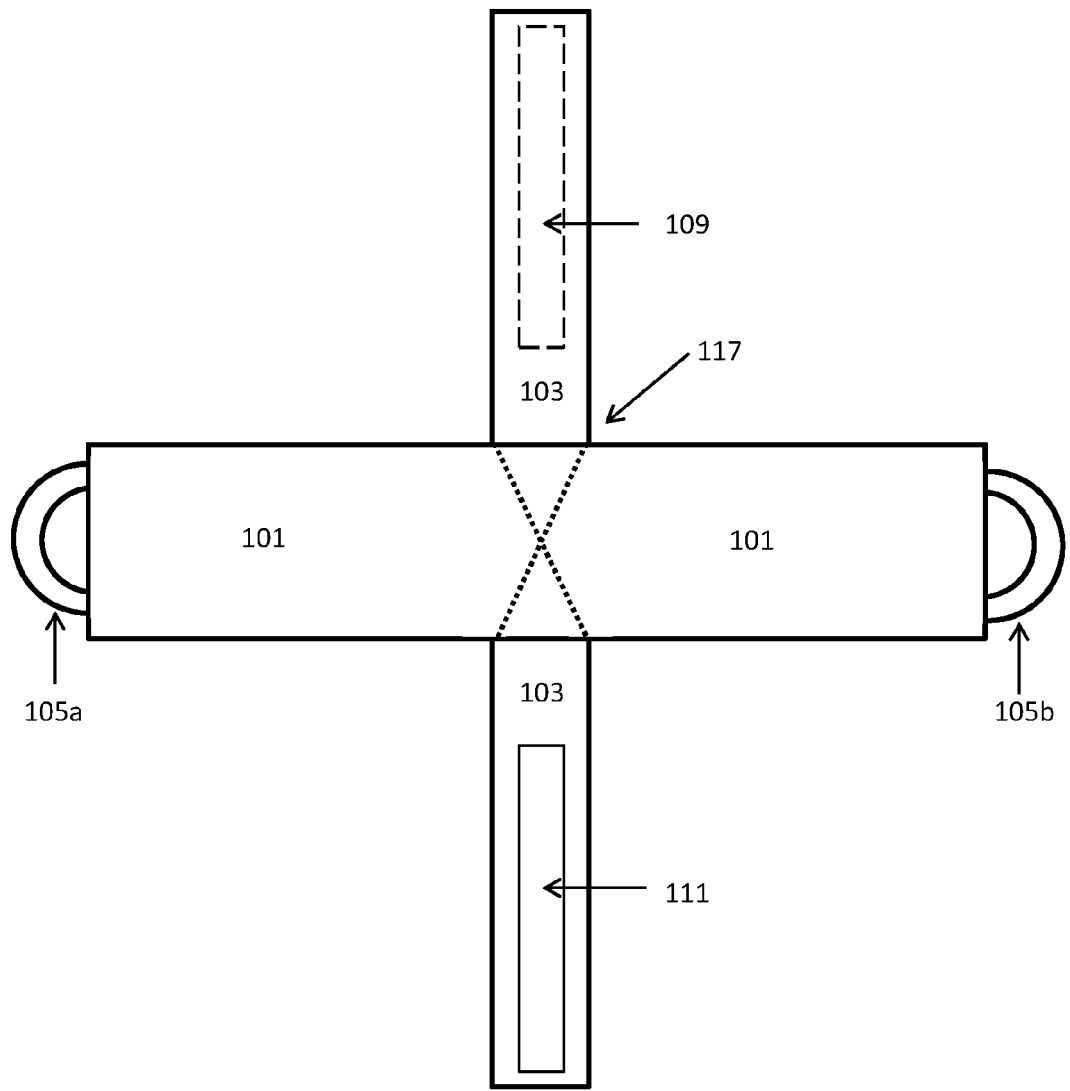
FIG. 4 is a schematic diagram of a bottom view of a second embodiment of the carrier in an open position.
Figure 5:
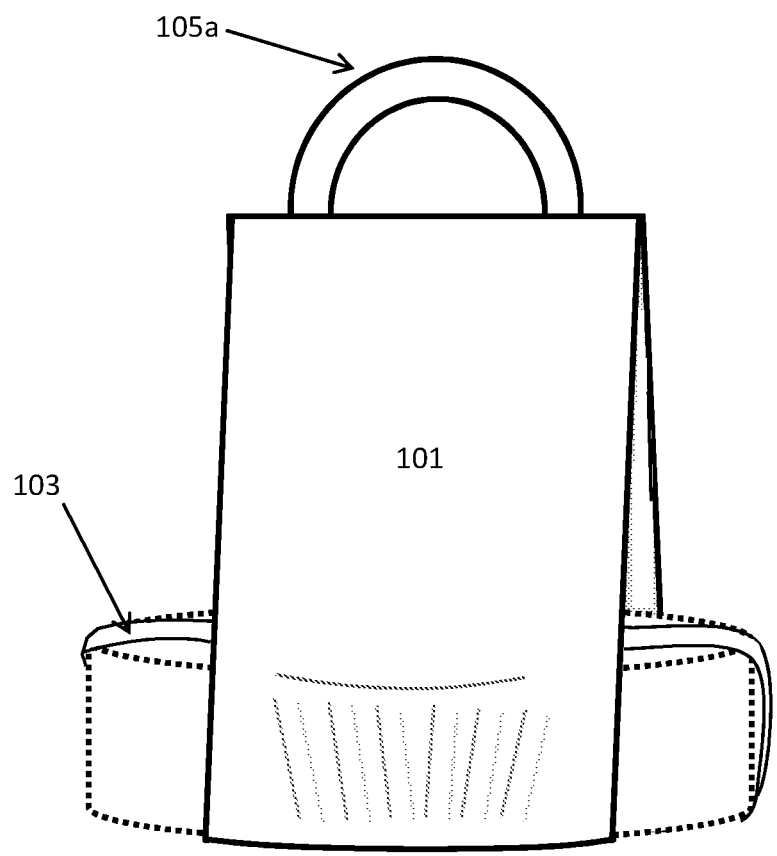
FIG. 5 is a schematic diagram of a side view of the carrier in a closed position.

In another embodiment depicted in FIGS. 3 and 4, hook-and-loop tape elements 113 and 115 are removed. In this embodiment, hook-and-loop tape elements 109 and 111 are elongated to extend to near the edge of securing panel 103.

A suitable carrier has a handle panel in the range of from 30 inches to 38 inches in length and about 9.5 inches in width and a securing panel in the range of from 36 inches to 44 inches in length and in the range of from 4.5 inches to 9.5 inches in width.

Several embodiments of the carrier of the invention have been described above and in the accompanying drawings, and other modifications will be apparent to those of ordinary skill in the art. The scope of protection to be accorded to the invention is to be determined by the claims that follow.

I claim:

1. A flexible and adjustable carrier, the carrier comprising:
   a. a handle panel (101) comprising
      an interior side,
      an exterior side,
      a first central section, and
      first opposing ends;
   b. a securing panel (103) securely connected to the handle panel (101) via a fastening device (117), the securing panel having a longitudinal axis and comprising
      an interior side,
      an exterior side,
      a second central section, and
      second opposing ends;
   c. handles (105a and 105b) secured by handle fasteners (107a and 107b, respectively) to each of the opposing ends of handle panel (101) for lifting the carrier when the handles are brought together above the respective first and second central sections of the handle panel (101) and securing panel (103);
   d. a first strip of hook-and-loop tape (109) secured to the interior side and extending along the longitudinal axis of the securing panel (103);
   e. a second strip of hook-and-loop tape (113) secured to the interior side and extending transversely to the longitudinal axis proximate one of the ends of securing panel (103);
   f. a third strip of hook-and-loop tape (111) secured to the exterior side and extending along the longitudinal axis of the securing panel (103);
   g. a fourth strip of hook-and-loop tape (115) secured to the exterior side and extending transversely to the longitudinal axis proximate the other end of securing panel (103).

2. The carrier of claim 1, wherein the handle panel (101) is rectangular.

3. The carrier of claim 1, wherein the securing panel (103) is rectangular.

4. The carrier of claim 1, wherein the handle panel (101) is made of fabric that is folded onto itself to form a double thickness.

5. The carrier of claim 4, wherein the handle fasteners (107a) and (107b) are made of fabric and are stitched between the doubled fabric of handle panel (101).

6. The carrier of claim 5, wherein the handle fasteners (107a and 107b) have a hook-and-loop-tape side facing away from the handle panel (101).

7. The carrier of claim 4, wherein the first, second, third, and fourth strips of hook-and-loop tape (109), (111), (113), and (115) are stitched to the securing panel (103).

8. The carrier of claim 4, wherein the handle panel (101) is joined by stitching (117) to securing panel (103).

9. The carrier of claim 1, wherein the carrier is made out of paper.

10. The carrier of claim 9, wherein the handle fasteners (107a) and (107b) are made of paper and are bonded to handle panel (101) under a paper strip.

11. The carrier of claim 9, wherein the first, second, third, and fourth strips of hook-and-loop tape (109), (111), (113), and (115) are bonded to the securing panel (103).

12. The carrier of claim 9, wherein the handle panel (101) is joined by adhesive bonding (117) to securing panel (103).

13. The carrier of claim 1, wherein the handle panel (101) is made of plastic.

14. The carrier of claim 13, wherein the handle fasteners (107a) and (107b) are made of plastic and are bonded to handle panel (101) under a plastic strip.

15. The carrier of claim 13, wherein the first, second, third, and fourth strips of hook-and-loop tape (109), (111), (113), and (115) are bonded to the securing panel (103).

16. The carrier of claim 13, wherein the handle panel (101) is joined by adhesive bonding (117) to securing panel (103).

17. The carrier of claim 16, wherein the handle panel (101) is joined by stitching (117) to securing panel (103).

18. The carrier of claim 1, wherein the handle panel (101) is made of jute that is folded onto itself to form a double thickness.

19. The carrier of claim 18, wherein the handle fasteners (107a) and (107b) are made out of jute and are stitched between the doubled jute of handle panel (101).

20. The carrier of claim 18, wherein the first, second, third, and fourth strips of hook-and-loop tape (109), (111), (113), and (115) are stitched to the securing panel (103).

* * * * *